US009180061B2

(12) United States Patent
Engman et al.

(10) Patent No.: US 9,180,061 B2
(45) Date of Patent: Nov. 10, 2015

(54) WHEELCHAIR LEGREST ASSEMBLY

(71) Applicant: Permobil AB, Timra (SE)

(72) Inventors: Bo Engman, Sundsvall (SE); Urban Lind, Alno (SE); Niklas Backstrom, Sundsvall (SE); Jonas Jahkel, Hagersten (SE); Mehdi Mirzaie, Brentwood, TN (US)

(73) Assignee: Permobil AB, Timra (SE)

( * ) Notice: Subject to any disclaimer, the term of this patent is extended or adjusted under 35 U.S.C. 154(b) by 0 days.

(21) Appl. No.: 14/070,792

(22) Filed: Nov. 4, 2013

(65) Prior Publication Data

US 2014/0070591 A1 Mar. 13, 2014

Related U.S. Application Data

(63) Continuation of application No. 13/900,644, filed on May 23, 2013, which is a continuation of application No. 12/895,355, filed on Sep. 30, 2010, now Pat. No. 8,474,849.

(51) Int. Cl.
*B60K 1/00* (2006.01)
*A61G 5/12* (2006.01)
*A61G 5/04* (2013.01)

(52) U.S. Cl.
CPC . *A61G 5/12* (2013.01); *A61G 5/045* (2013.01); *A61G 2005/127* (2013.01); *A61G 2005/128* (2013.01)

(58) Field of Classification Search
CPC . A61G 2005/128; A61G 5/12; A61G 5/1075; A61G 2005/1054; A61G 5/006; A61G 5/08; A61G 5/10; A61G 5/00; A61G 5/14; A61G 2005/127; A61G 2200/36; A61G 2200/34; Y10S 297/04; Y10S 180/907; A47C 4/12
USPC ......... 280/250.1, 304.1; 180/907; 297/423.26
See application file for complete search history.

(56) References Cited

U.S. PATENT DOCUMENTS 5,217,239 A * 6/1993 Koet ........................ 280/250.1
5,297,021 A * 3/1994 Koerlin et al. ................ 700/56

(Continued)

FOREIGN PATENT DOCUMENTS

EP 1 522 297 A2 4/2005
EP 1 977 466 A2 12/2008

OTHER PUBLICATIONS

Permobil, Corpus II Owner's Manual, Edition No. 1, published May 1999.

(Continued)

*Primary Examiner* — Paul N Dickson
*Assistant Examiner* — Bridget Avery
(74) *Attorney, Agent, or Firm* — McAndrews, Held & Malloy, Ltd.

(57) ABSTRACT

A powered wheelchair includes a seat assembly configured to support an individual, a legrest assembly pivotally connected to the seat assembly, and an adjustment assembly including an actuator operatively connected to the central column through a piston slidably secured within a sleeve. The adjustment assembly is secured underneath the seat assembly. The powered wheelchair may also include an extension bracket that allows legrests and a central column of the legrest assembly to be separately and independently adjusted with respect to one another.

14 Claims, 7 Drawing Sheets

(56) References Cited

U.S. PATENT DOCUMENTS

| | | | | |
|---|---|---|---|---|
| 5,421,598 | A * | 6/1995 | Robertson et al. | 280/250.1 |
| 6,276,704 | B1 | 8/2001 | Suiter | |
| 6,375,209 | B1 | 4/2002 | Schlangen | |
| 2006/0071531 | A1 | 4/2006 | Groth | |
| 2010/0117328 | A1 * | 5/2010 | Johnson et al. | 280/250.1 |

OTHER PUBLICATIONS

Permobil, Corpus II Owner's Manual, Edition No. 3, published Dec. 2004.

Permobil, Corpus II (incl. Seat Elevators) Spare Parts Catalog, published May 1995.

Excerpt from Corpus II Spare Parts Catalog, Ergonomic Backrest Kits, updated Aug. 23, 2010.

Excerpt from Corpus II Spare Parts Catalog, Seat Frame, updated Aug. 23, 2010.

The State Intellectual Property Office of the People's Republic of China, Office Action issued Apr. 3, 2015, Application No. 2011800466472. Chinese OA (6 pages); English translation (7 pages).

European Search Report mailed Apr. 17, 2014, EP 14 15 6391 (6 pages).

Patent Cooperation Treaty, Notification of Transmittal of the International Search Report and the Written Opinion of the International Searching Authority, in International application No. PCT/US2011/054242, dated Jan. 2, 2012 (11 pages).

* cited by examiner

WHEELCHAIR LEGREST ASSEMBLY

RELATED APPLICATIONS

This application claims priority to U.S. Non-Provisional patent application Ser. No. 13/900,644, titled "Wheelchair Legrest Assembly," filed on May 23, 2013. U.S. Non-Provisional patent application Ser. No. 13/900,644 claims priority in turn to U.S. Non-Provisional patent application Ser. No. 12/895,355 filed on Sep. 30, 2010, titled "Wheelchair Legrest Assembly," and now issued as U.S. Pat. No. 8,474,849. U.S. Non-Provisional patent application Ser. Nos. 13/900,644 and 12/895,355 are hereby incorporated by reference in their entireties.

FIELD OF EMBODIMENTS OF THE INVENTION

Embodiments of the present invention generally relate to wheelchairs, and, more particularly, to legrest assemblies for wheelchairs.

BACKGROUND

Power wheelchairs are used by disabled individuals in order to move around in comfort and relative ease. Indeed, these wheelchairs have improved throughout the years to provide numerous features that provide additional comfort to individuals.

A power wheelchair typically includes a base having wheels. The base supports a seat assembly. The individual controls operation of the wheelchair through a control interface, such as a joystick, typically positioned on an armrest of the seat assembly. The control interface is in electrical communication with a processing system that is also connected to motors that drive the wheels, a steering mechanism, and the like. The processing system generally controls overall operation of all powered aspects of the wheelchair.

A wheelchair also includes legrests in which an individual positions his/her legs. Many legrests are adjustable such that they may be moved through various positions.

FIGS. 1 and 2 illustrate isometric side and front views, respectively, of a conventional power wheelchair 10. As shown in FIGS. 1 and 2, the wheelchair 10 includes a seat assembly 12 and a legrest assembly 14 connected to the seat assembly 12. The legrest assembly 14 includes a central column 16 extending from and proximate to a front edge of the seat assembly 12. Calf supports 18 are positioned on either side of the central column 16 below the seat assembly 12. Footrests 20 extend from an end of the column 16 that is distal from the seat assembly 12. As shown, in the normal position, the footrests 20 are generally parallel with the seating area of the seat assembly 12, while the calf supports 18 and central column 16 are generally perpendicular to the seating area.

The legrest assembly 14 may be adjusted so that it may rotate upward about an area where it connects to the seat assembly 12. That is, a proximal end of the central column 16 is pivotally connected to the seat assembly 12.

In order to adjust the legrest assembly 14, an actuator 22 may be engaged to move the legrest assembly 14. As shown in FIG. 1, the actuator 22 is positioned behind the legrest assembly 14. The actuator 22 is typically secured to the central column 16.

The position of the actuator 22 behind and on the legrest assembly 14 provides a bulky assembly. The actuator 22 adds weight to the legrest assembly 14. As such, when moving the legrest assembly 14, the actuator 22 uses energy sufficient to move both the legrest assembly 14 and the actuator 22 itself. The added weight and bulk, as well as the center of gravity, may cause adjustment of the legrest assembly to be uneven and halting.

FIG. 3 illustrates an isometric side view of the conventional power wheelchair 10 in which the legrest assembly 14 is outwardly adjusted. As shown in FIG. 3, the actuator 22, which is attached to the legrest assembly 14, moves the legrest assembly 14 and the actuator 22 in the direction of arc A. The legrest assembly 14 pivotally moves in the direction of arc A about a hinged interface that connects the legrest assembly 14 to the seat assembly 12. An individual may adjust the legrest assembly 14 through various positions, such as through a control interface.

As shown in FIGS. 1-3, the central column 16 of the legrest assembly 14 is straight. When the legrest assembly 14 is adjusted upwardly in the direction of arc A, the straight central column 16 typically causes the force of the weight of the individual legs to concentrate onto the heels that are supported by the footrests 20. As the legrest assembly 14 continues to move upward in the direction of arc A, the concentration of the weight on the heels typically increases, which may cause the individual seated in the wheelchair to experience discomfort.

Additionally, conventional wheelchair assemblies such as shown in FIGS. 1-3 provide a limited range of adjustability. Also, in order to adjust the length of the individual legrests of the legrest assembly 14, a separate and distinct mechanism, such as a hinge mechanism 24 positioned behind each legrest is used. However, the hinge mechanism 24 on each legrest adds even more weight and bulk to the legrest assembly 14.

SUMMARY OF EMBODIMENTS OF THE INVENTION

Certain embodiments of the present invention provide a wheelchair that includes a seat assembly configured to support an individual, a legrest assembly pivotally connected to the seat assembly, and an adjustment assembly configured to adjust the legrest assembly through a range of motion. The adjustment assembly may include an actuator operatively connected to the legrest assembly through a piston slidably secured within a sleeve. The adjustment assembly is secured underneath the seat assembly.

The legrest assembly may include a central column secured to legrest beams. The central column may include a first or male beam slidably secured to a second or female beam.

The central column is adjustably secured to the legrest beams through an extension bracket that allows for each of the central column and the legrest beams to be independently adjusted with respect to one another.

The extension bracket may include a central channel and two lateral channels. The legrest beams may be adjustably secured within the lateral channels, and the central column may be adjustably secured within the central channel. Each of the central channel and the lateral channels may connect to at least one threaded bore configured to receive a set screw. The set screws may be selectively tightened and loosened to adjust the legrest beams with respect to one another and the central column. Further, the extension bracket may be adjusted with respect to the central column in a like manner.

The wheelchair may also include a bracing bracket having a track secured underneath the seat assembly. The central column may connect to the bracing bracket through a rolling bracket having rollers abutting the track. The rolling bracket may be spring-biased with respect to the central column.

Certain embodiments of the present invention provide a legrest assembly for a wheelchair. The legrest assembly includes a central column having an end configured to be pivotally connected to a seat assembly of the wheelchair, a first legrest beam secured to one side of the central column, and a second legrest beam secured to an opposite side of the central column. The curve of each legrest beam may be aligned and consistent with that of the central column.

The central column may include a male beam slidably secured to a female beam. The first and second legrest beams may be secured to the female beam.

The legrest assembly may also include an extension bracket adjustably secured to each of the central column and the first and second legrest beams. The extension bracket secures the first and second legrest beams to the central column. The extension bracket allows for each of the central column and the first and second legrest beams to be independently adjusted with respect to one another.

The extension bracket may include a central channel and first and second lateral channels. The first and second legrest beams may be adjustably secured within the first and second lateral channels, respectively. The central column is adjustably secured within the central channel. Each of the central channel and the first and second lateral channels connects to at least one threaded bore configured to receive a set screw.

Certain embodiments of the present invention provide a powered wheelchair that includes a support base having wheels, a seat assembly supported by the support base, a legrest assembly, and an adjustment assembly. The legrest assembly is pivotally connected to the seat assembly. The legrest assembly includes (i) a central column having an end configured to be pivotally connected to a seat assembly of the wheelchair, (ii) a first legrest beam secured to one side of the central column, (iii) a second legrest beam secured to an opposite side of the central column, and (iv) an extension bracket adjustably secured to each of the central column and the first and second legrest beams. The extension bracket secures the first and second legrests to the central column. The extension bracket allows for each of the central column and the first and second legrest beams to be independently adjusted with respect to one another.

The adjustment assembly may include an actuator operatively connected to the central column through a piston slidably secured within a sleeve. The adjustment assembly may be secured underneath the seat assembly.

Figure 1:
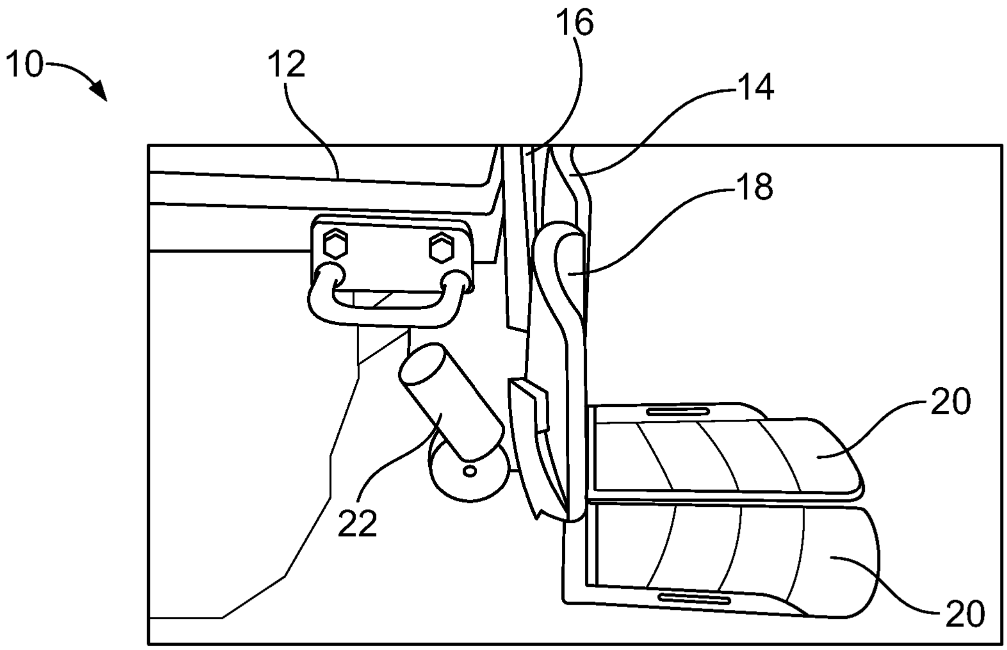
FIG. 1 (prior art)
FIG. 1 illustrates an isometric side view of a conventional power wheelchair.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE INVENTION

Figure 4:
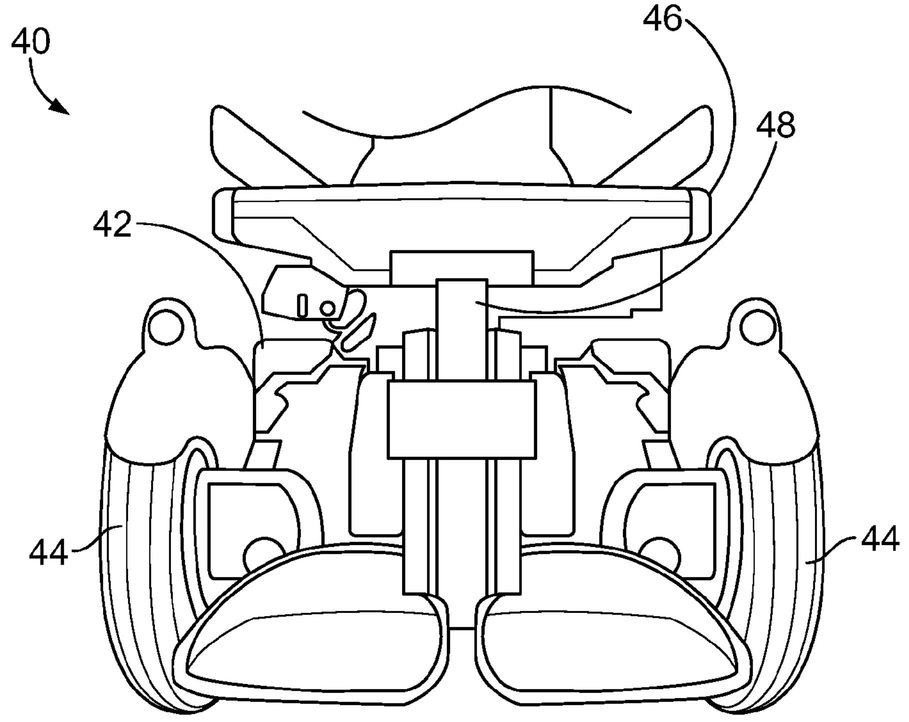
FIG. 4 illustrates a front view of a power wheelchair, according to an embodiment of the present invention.

FIG. 4 illustrates a front view of a power wheelchair 40, according to an embodiment of the present invention. The wheelchair 40 includes a support base 42 having wheels 44. The support base 42 supports a seat assembly 46. A legrest assembly 48 pivotally connects to the seat assembly 46.

Figure 5:
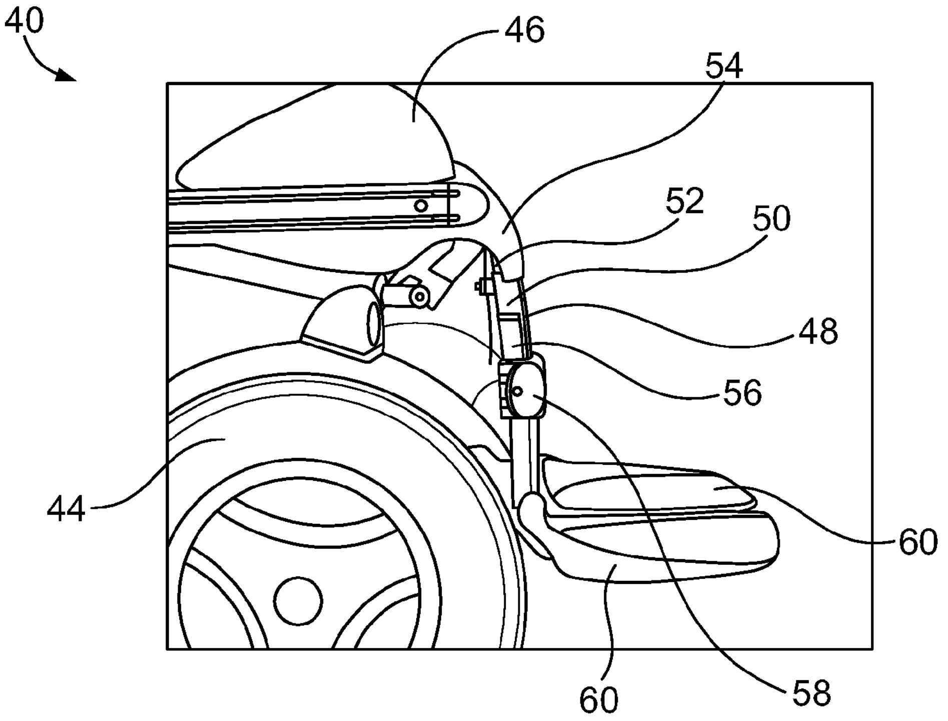
FIG. 5 illustrates a side view of a power wheelchair, according to an embodiment of the present invention.

FIG. 5 illustrates a side view of the power wheelchair 40. The legrest assembly 48 includes a central column 50 having a proximal end 52 that secures to a pivot bracket 54 that connects to the seat assembly 46.

The central column 50 is secured to legrest beams 56 through an extension bracket 58. Distal ends of the legrest beams 56 are connected to footrests 60.

Unlike the conventional wheelchair, the central column 50 and the legrest beams 56 are curved. The central column 50 and the legrest beams 56 generally bow out from proximal ends (closest to the seat assembly 46) and arc back from the bowed out area toward distal ends (closest to the footrests). Thus, the centers of the central column 50 and the legrest beams 56 may bow out to a greater extent than the ends of the respective central column 50 and the legrest beams 56.

Because the legrest assembly 48 is curved, as described above, the legrest assembly 48 moves along an arc as it rotates about the seat assembly 46. It has been found that the curved nature of the legrest assembly 48 adjusts the position of the footrests 60 during movement, which relieves pressure on an individual's heels as the legrest assembly 48 pivots outwardly from the seat assembly 46.

Figure 6:
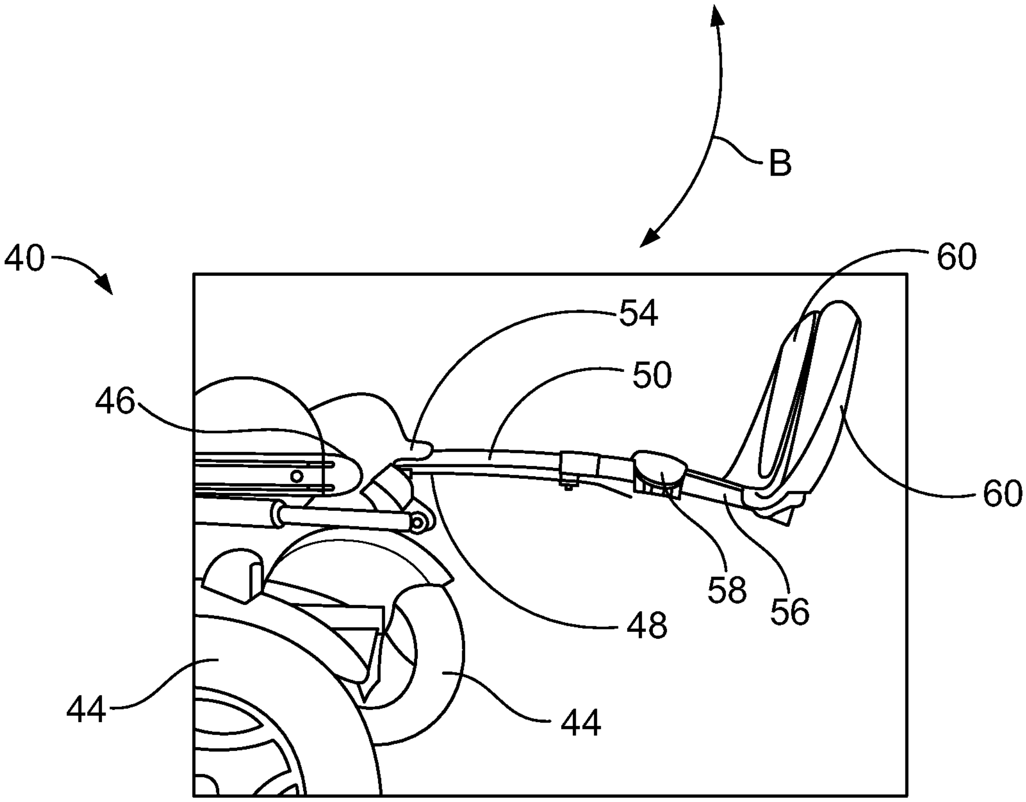
FIG. 6 illustrates a side view of a power wheelchair in which a legrest assembly is outwardly adjusted, according to an embodiment of the present invention.

FIG. 6 illustrates a side view of the power wheelchair 40 in which the legrest assembly 48 is outwardly adjusted. An individual may operate the wheelchair 40 to adjust the legrest assembly 48 through a range of motion such as along arc B. As shown in FIG. 6, for example, the curve of the central column 50 may be evenly and consistently aligned and in conformity with the curve of each legrest beam 56. That is, the legrest beams 56 connect to the central column such that an even and contiguous curve ranges over the entire length from the central column 50 to the ends of the legrest beams 56.

Figure 7:
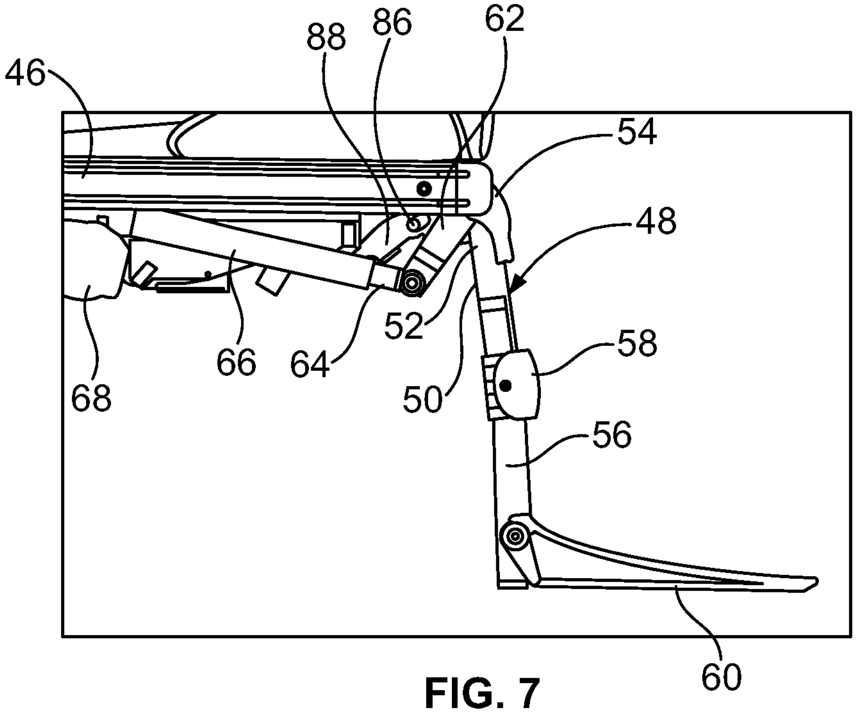
FIG. 7 illustrates a side view of a legrest assembly connected to a seat assembly, according to an embodiment of the present invention.

FIG. 7 illustrates a side view of the legrest assembly 48 connected to the seat assembly 46, according to an embodiment of the present invention. The proximal end 52 of the central column 50 pivotally connects to the seat assembly 46 through the pivot bracket 54. The pivot bracket 54, in turn, connects to an axle (not shown in FIG. 7), which, in turn, connects to a link 62. The link 62 connects to a distal end of a piston 64 that is slidably secured within a sleeve 66. The piston 64 is configured to slide into and out of the sleeve 66 by way of an actuator 68. Movement of the piston 64 may be controlled through hydraulics, pneumatics, or the like.

Figure 2:
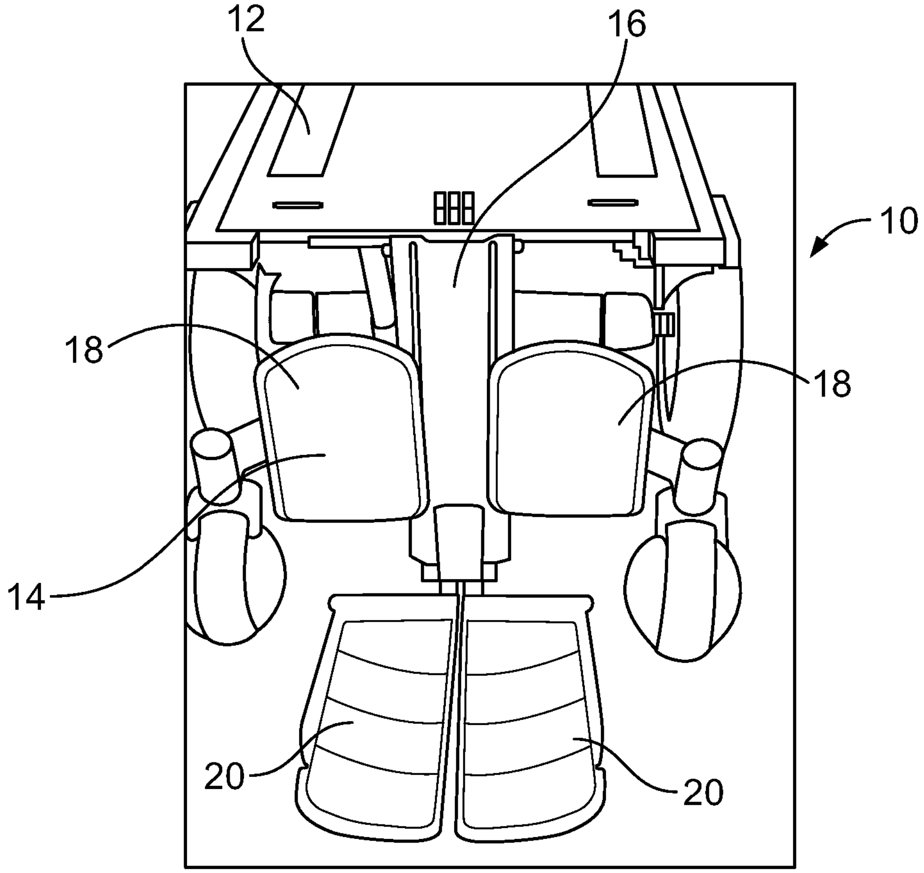
FIG. 2 (prior art)
FIG. 2 illustrates an isometric front view of a conventional power wheelchair.
Figure 3:
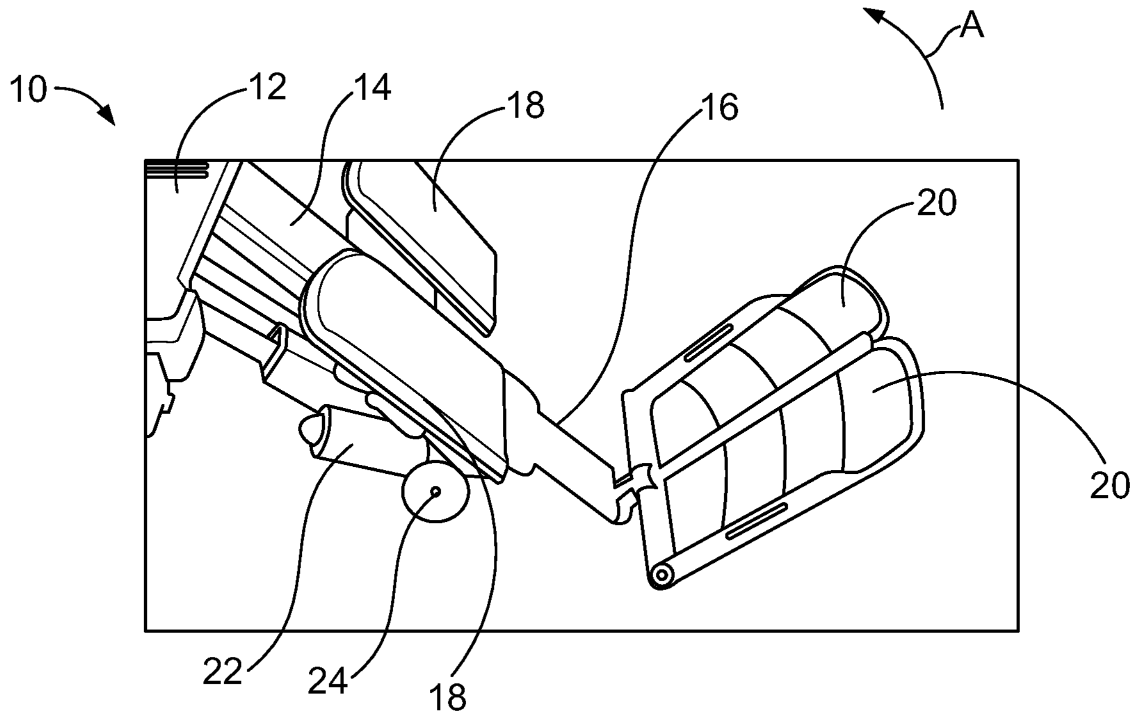
FIG. 3 (prior art)
FIG. 3 illustrates an isometric side view of a conventional power wheelchair in which a legrest assembly is outwardly adjusted.

As shown in FIG. 7, the actuator 68 is secured underneath the seat assembly 46, instead of behind and on the legrest assembly 48. Thus, the legrest assembly 48 is lighter and less bulky than that of the conventional wheelchair 10 (shown in FIGS. 1-3).

Figure 8:
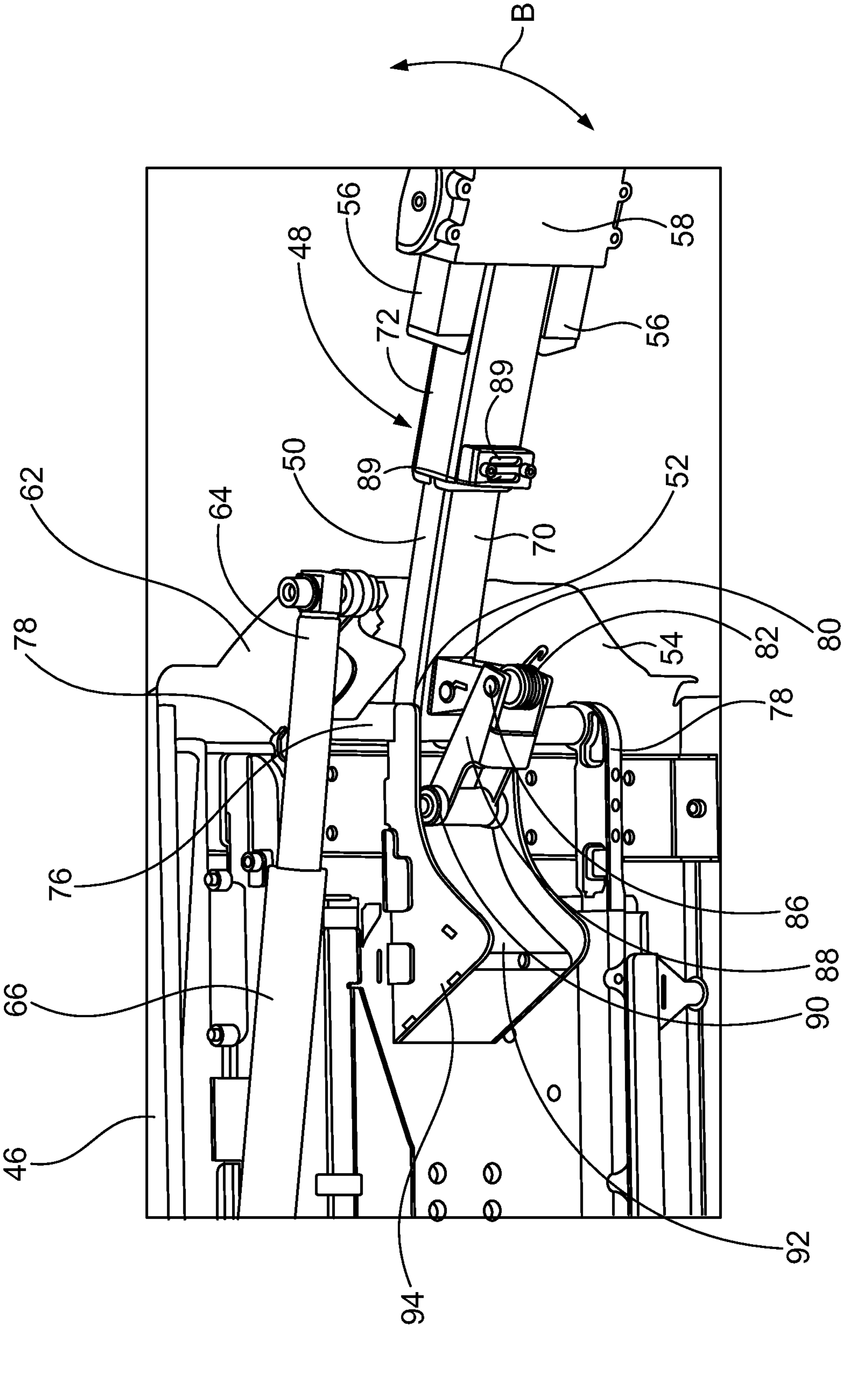
FIG. 8 illustrates an isometric bottom view of a legrest assembly connected to a seat assembly, according to an embodiment of the present invention.

FIG. 8 illustrates an isometric bottom view of the legrest assembly 48 connected to the seat assembly 46. The central column 50 may include a male beam 70 that may be adjusted with respect to a female beam 72. That is, the male beam 70 may fit within a channel within the female beam 72, and the female beam 72 may be adjusted for length with respect to the male beam 70.

A clamp 74 configured for receiving a web belt (not shown) that operatively connects to a rolling bracket 86 allows the female beam 72 to slide outwardly from the male beam 70. Optionally, the central column 50 may be a single unitary beam.

In any event, the proximal end 52 of the central column 50 secures to an axle 76 that is rotatably secured by opposing brackets 78 underneath the seat assembly 46. Optionally, the central column 50 may be integrally formed with the axle 76. The link 62 secures to the pivot bracket 54, which is secured to the central column 50 and/or the axle 76. Thus, when the actuator 68 (not shown in FIG. 8) moves the piston 64, the axle 76 and the central column 50 move in response to adjust the position of legrest assembly 48.

A stud 80 extends beneath the central column 50 proximate the union with the axle 76. The stud 80 includes a spring 82 secured around a pin 86 that connects the stud 80 to a rolling bracket 88. The rolling bracket 88 includes wheels or rollers 90 at an end that is distally located from the pin 86. The rollers 90 are positioned within a curved track 92 of a bracing bracket 94. In an alternative embodiment, the wheelchair 40 may not include the stud 80, the rolling bracket 88 and the bracing bracket 94.

As the legrest assembly 48 moves outwardly from the seat assembly 46, the piston 64 pivots the central column 50 about the axle 76. As such, the rolling bracket 88 moves through the curved track 92 toward the axle 76. The spring 82, which is operatively connected to the rolling bracket 88, responsively resists and keeps the rollers 90 within the curved track 92 at all positions along the curved track 92. Consequently, the rolling bracket 88 pivots with respect to the stud 80 about the pin 86. Accordingly, the rolling bracket 88 provides bracing support to the legrest assembly 48 as the legrest assembly 48 moves. When the legrest assembly 48 moves back to its original position, the spring 82 ensures that the rollers 90 remain in the curved track 92.

A web belt (not shown), which may be formed of plastic, an elastomeric material, flexible metal, or the like, may be secured to the rolling bracket 88. The web belt may pass around the axle of the rollers 90. The web belt may also connect to the clamp 74. For example, the web belt may pass through the two aligned slots 89 formed through the clamp 74.

As the rollers 90 move, the rollers 90 adjust the tension in the web belt, allowing the female beam 72 to extend from the male beam 70 as tension is released, or pulling the female beam 72 onto the male beam 70 as tension is increased. In this manner, the web belt may allow for variable length of the female beam 72 with respect to the male beam 70.

Figure 9:
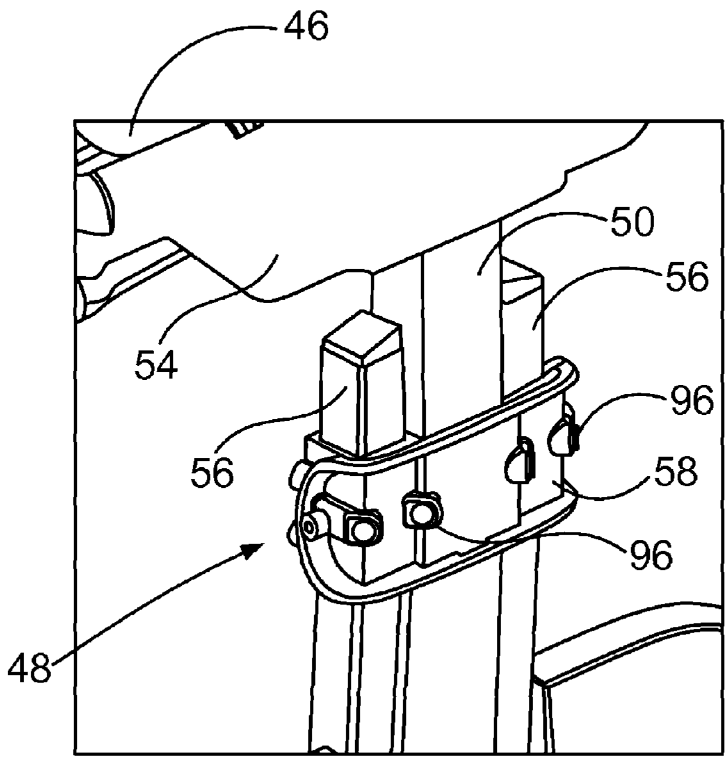
FIG. 9 illustrates an isometric front view of a legrest assembly, according to an embodiment of the present invention.

FIG. 9 illustrates an isometric front view of the legrest assembly 48, according to an embodiment of the present invention. The central column 50 securely connects to legrest beams 56 through the extension bracket 58.

Figure 10:
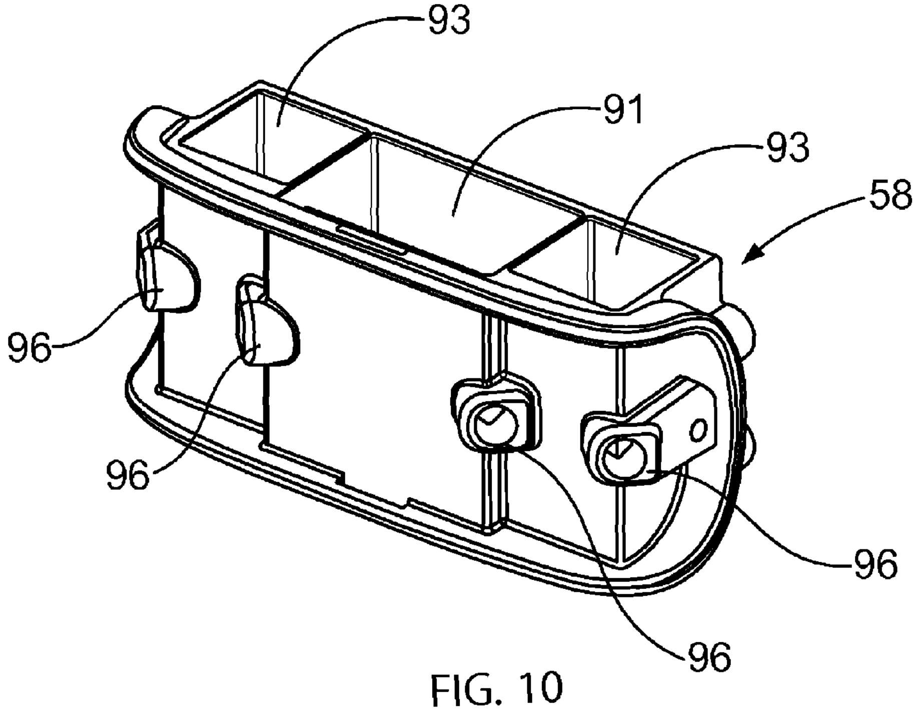
FIG. 10 illustrates an isometric front view of an extension bracket, according to an embodiment of the present invention.

FIG. 10 illustrates an isometric front view of the extension bracket 58, according to an embodiment of the present invention. The extension bracket 58 includes a main body 89 having a central channel 91 and lateral channels 93 formed therethrough. A plurality of threaded bores 96 are formed through the main body 89 and connect to the channels 91 and 93. For example, as shown in FIG. 10, outer bores 96 connect to the lateral channels 93 while inboard bores 96 connect to the central channel 91.

The threaded bores 96 are configured to receive and threadably retain set screws (not shown). The set screws are used to adjust the central column 50 and the legrest beams 56 within the central and lateral channels 91 and 93, respectively.

Referring to FIGS. 9 and 10, the central column 50 passes through the central channel 91, while the legrest beams 56 pass through the lateral channels 93. To secure the central column 50 and the legrest beams 56 in position, set screws within the threaded bores 96 are engaged and abut into the central column 50 and legrest beams 56, thereby securing them in position.

The extension bracket 58 allows for individual adjustment of legrest beams 56 with respect to the central column 50. Additionally, the extension bracket 58 may be adjusted with respect to the central column 50. That is, the set screws that engage the central column 50 may be loosened so that the extension bracket 58 may be slid up or down the central column 50 to a desired position, at which point the set screws may be tightened to secure the extension bracket 58 in place. Similarly, each legrest beam 56 may be individually adjusted with respect to the extension bracket 58.

Thus, the extension bracket 58 allows for separate and independent adjustment of the legrest beams 56 and the central column 50. Moreover, the extension bracket 58 provides a simple and light system for adjustment that does not significantly add weight and bulk to the legrest assembly 48.

Figure 11:
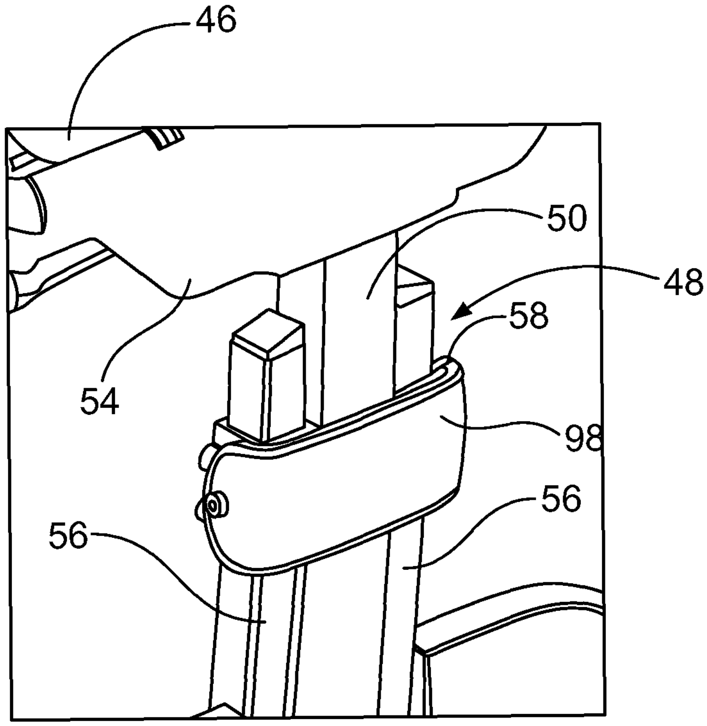
FIG. 11 illustrates an isometric front view of a legrest assembly, according to an embodiment of the present invention.

FIG. 11 illustrates an isometric front view of the legrest assembly 48. As shown in FIG. 11, a removable cover 98 may be positioned on the extension bracket 58. The cover 98 is positioned over a cavity in which the threaded bores 96 (shown in FIGS. 9 and 10) are located. The cover 98 may be secured to the extension bracket 58 through separate fasteners, or the cover 98 may snapably secure to the extension bracket 58.

Figure 12:
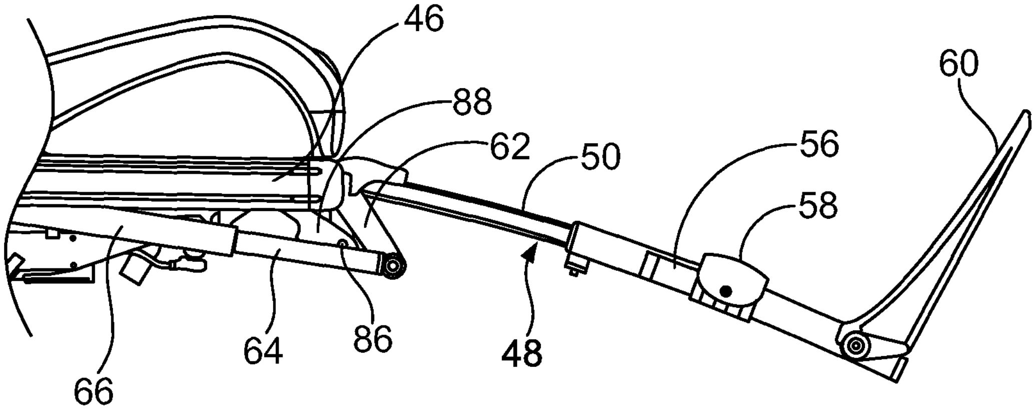
FIG. 12 illustrates a side view of a legrest assembly adjusted outwardly with legrest beams extended, according to an embodiment of the present invention.

FIG. 12 illustrates a side view of the legrest assembly 48 adjusted outwardly with legrest beams 56 extended, according to an embodiment of the present invention. In this position, the legrest beams 56 have been slidably extended with respect to the extension bracket 58. As noted above, the legrest beams 56 may be adjusted with respect to the extension bracket 58, and the extension bracket 58 may be slidably adjusted over the length of the central column 50 to accommodate a wide range of lengths. Additionally, as noted above, the curved nature of the legrest assembly 48 reduces the concentration of the weight of an individual's heels into the footrests 60.

Thus, embodiments of the present invention provide a legrest assembly for a wheelchair. Unlike the conventional wheelchair shown in FIGS. 1-3, the actuator is positioned underneath the seat assembly. Accordingly, the legrest assembly is less bulky.

Further, the curved nature of the legrest assembly provides for increased comfort, as compared to the straight legrests of conventional wheelchairs.

Additionally, the simple, efficient, and light extension bracket allows for length adjustment of the legrest assembly. The extension bracket provides a lighter and less bulky legrest assembly as compared to the conventional wheelchair shown and described with respect to FIGS. 1-3.

Overall, it has been found that embodiments of the present invention provide a legrest assembly for a powered wheelchair that slides more smoothly and over a greater range than conventional wheelchairs, due to the curved nature of the legrest assembly and the actuator underneath the seat assembly. Additionally, embodiments of the present invention provide a lighter legrest assembly as compared to conventional wheelchairs. Moreover, it has been found that embodiments of the present invention provide a stronger and more stable legrest assembly. As noted above, embodiments of the present invention also provide a legrest assembly that reduces pressure on an individual's feet, as compared to prior wheelchairs.

Also, embodiments of the present invention provide a fully-adjustable legrest assembly that is simpler than previous legrest assemblies. That is, embodiments of the present invention provide a legrest assembly with less parts and simpler operation as compared to prior wheelchairs.

While various spatial and directional terms, such as top, bottom, lower, mid, lateral, horizontal, vertical, front and the like, may used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A legrest assembly for a wheelchair comprising:

a central column having an end configured to be pivotally connected to a seat assembly of the wheelchair;

a first legrest beam secured to one side of said central column wherein said first leg rest beam and said central column are oriented generally parallel to each other; and a second legrest beam secured to an opposite side of said central column wherein said second leg rest beam and said central column are oriented generally parallel to each other, wherein said central column comprises a male beam and a female beam that are slidably connected to each other such that one of said male beam and female beam slides with respect to the other of said male beam and female beam, and wherein said first and second legrest beams are secured to said female beam.

2. The legrest assembly of claim 1, further comprising an extension bracket adjustably secured to each of said central column and said first and second legrest beams, wherein said extension bracket secures said first and second legrest beams to said central column, and wherein said extension bracket allows for each of said central column and said first and second legrest beams to be independently adjusted with respect to one another.

3. The legrest assembly of claim 2, wherein said extension bracket comprises a central channel and first and second lateral channels, wherein said first and second legrest beams are adjustably secured within said first and second lateral channels, respectively, and wherein said central column is adjustably secured within said central channel.

4. The legrest assembly of claim 3, wherein each of said central channel and said first and second lateral channels connects to at least one threaded bore configured to receive a set screw.

5. A powered wheelchair comprising:

a support base having wheels;

a seat assembly supported by said support base;

a legrest assembly pivotally connected to said seat assembly, wherein said legrest assembly includes (i) a central column having an end configured to be pivotally connected to a seat assembly of the wheelchair, (ii) a first legrest beam secured to one side of said central column, (iii) a second legrest beam secured to an opposite side of said central column, and (iv) an extension bracket adjustably secured to each of said central column and said first and second legrest beams, wherein said extension bracket secures said first and second legrest beams to said central column, and wherein said extension bracket allows for each of said central column and said first and second legrest beams to be independently adjusted with respect to one another; and an adjustment assembly including an actuator operatively connected to said central column through a piston slidably secured within a sleeve, wherein said adjustment assembly is secured underneath said seat assembly.

6. The powered wheelchair of claim 5, wherein said central column comprises a male beam slidably secured to a female beam, and wherein said first and second legrest beams are secured to said female beam.

7. The powered wheelchair of claim 5, wherein said legrest outwardly bows out from ends to a central area.

8. The powered wheelchair of claim 5, wherein said extension bracket comprises a central channel and first and second lateral channels, wherein said first and second legrest beams are adjustably secured within said first and second lateral channels, respectively, and wherein said central column is adjustably secured within said central channel.

9. The powered wheelchair of claim 5, further comprising a bracing bracket having a track secured underneath said seat assembly, and wherein said central column connects to said bracing bracket through a rolling bracket having rollers abutting said track, wherein said rollers are operatively connected to a web belt that also operatively connects to a clamp positioned on said central column.

10. The powered wheelchair of claim 8, wherein each of said central channel and said first and second lateral channels connects to at least one threaded bore configured to receive a set screw.

11. The powered wheelchair of claim 9, wherein said rolling bracket is spring-biased with respect to said central column.

12. A legrest assembly for a wheelchair comprising:

a central column having an end configured to be pivotally connected to a seat assembly of the wheelchair;

a first legrest beam secured to one side of said central column;

a second legrest beam secured to an opposite side of said central column; and an extension bracket adjustably secured to each of said central column and said first and second legrest beams, wherein said extension bracket secures said first and second legrest beams to said central column, and wherein said extension bracket allows for each of said central column and said first and second legrest beams to be independently adjusted with respect to one another, wherein said extension bracket comprises a central channel and first and second lateral channels, wherein said first and second legrest beams are adjustably secured within said first and second lateral channels, respectively, and wherein said central column is adjustably secured within said central channel.

13. The legrest assembly of claim 12, wherein said central column comprises a male beam slidably secured to a female beam, and wherein said first and second legrest beams are secured to said female beam.

14. The legrest assembly of claim 12, wherein each of said central channel and said first and second lateral channels connects to at least one threaded bore configured to receive a set screw.

* * * * *